US008297514B2

(12) United States Patent
Stone

(10) Patent No.: US 8,297,514 B2
(45) Date of Patent: Oct. 30, 2012

(54) ELECTRONIC TAG

(75) Inventor: Kate Jessie Stone, Cambridgeshire (GB)

(73) Assignee: Novalia Limited, Cambridge (GB)

(*) Notice: Subject to any disclaimer, the term of this patent is extended or adjusted under 35 U.S.C. 154(b) by 484 days.

(21) Appl. No.: 11/990,234

(22) PCT Filed: Aug. 10, 2006

(86) PCT No.: PCT/GB2006/050236
§ 371 (c)(1),
(2), (4) Date: Jul. 3, 2009

(87) PCT Pub. No.: WO2007/017702
PCT Pub. Date: Feb. 15, 2007

(65) Prior Publication Data
US 2009/0294537 A1 Dec. 3, 2009

(30) Foreign Application Priority Data
Aug. 10, 2005 (GB) .................................. 0516387.8

(51) Int. Cl.
G06K 19/06 (2006.01)
G06K 19/02 (2006.01)
G08B 13/14 (2006.01)
(52) U.S. Cl. ..................................... 235/492; 340/572.7
(58) Field of Classification Search .................. 235/487, 235/488, 492; 340/572.1, 572.7, 10.1; 343/897, 343/893, 824, 812, 879, 700 MS, 867, 870
See application file for complete search history.

(56) References Cited

U.S. PATENT DOCUMENTS

| 3,378,920 | A | | 4/1968 | Cone | |
|---|---|---|---|---|---|
| 4,583,099 | A | * | 4/1986 | Reilly et al. | 343/895 |
| 5,608,417 | A | * | 3/1997 | de Vall | 343/895 |
| 5,870,066 | A | * | 2/1999 | Asakura et al. | 343/895 |
| 5,912,622 | A | * | 6/1999 | Endo et al. | 340/572.5 |
| 6,031,458 | A | * | 2/2000 | Jacobsen et al. | 340/572.5 |
| 6,087,940 | A | * | 7/2000 | Caperna et al. | 340/572.5 |
| 6,281,048 | B1 | * | 8/2001 | Vere et al. | 438/118 |
| 6,575,374 | B1 | * | 6/2003 | Boyadjian et al. | 235/492 |
| 6,622,921 | B2 | * | 9/2003 | Altwasser et al. | 235/492 |
| 6,680,702 | B2 | * | 1/2004 | Yde-Andersen et al. | 343/700 MS |
| 6,796,508 | B2 | * | 9/2004 | Muller | 235/492 |
| 7,274,297 | B2 | * | 9/2007 | Kodukula et al. | 340/572.7 |
| 7,310,070 | B1 | * | 12/2007 | Hardman et al. | 343/742 |
| 2003/0218072 | A1 | * | 11/2003 | Hanhikorpi | 235/492 |
| 2004/0084525 | A1 | * | 5/2004 | Kreiner et al. | 235/384 |
| 2004/0200061 | A1 | * | 10/2004 | Coleman et al. | 29/825 |

(Continued)

FOREIGN PATENT DOCUMENTS
DE 3619530 10/1987
(Continued)

Primary Examiner — Michael G Lee
Assistant Examiner — Suezu Ellis
(74) Attorney, Agent, or Firm — Ware, Fressola, Van Der Sluys & Adolphson LLP

(57) ABSTRACT

A printed electronic tag (2) for packaging comprising a first set of spaced, electrically-conductive lines (4) overlying a substrate (5), an electrically-insulating layer (6) overlying at least a portion of the first set of lines, a second set of spaced, electrically-conductive lines (8) overlying the insulating layer, arranged to cross the first set of lines, the insulating layer configured to provide at least one region (10) for providing electrical contact between a line in the first set of the conductive lines and a line in the second set of lines.

24 Claims, 2 Drawing Sheets

U.S. PATENT DOCUMENTS

2006/0043198 A1* 3/2006 Forster .......................... 235/492
2006/0232413 A1* 10/2006 Lam et al. .................. 340/572.1
2007/0023525 A1* 2/2007 Son et al. ...................... 235/454
2008/0238613 A1* 10/2008 Salva Calcagno ........... 340/5.83

FOREIGN PATENT DOCUMENTS

| | | |
|---|---|---|
| GB | 1460659 | 1/1977 |
| GB | 2207815 | 2/1989 |
| GB | 2400710 | 10/2004 |
| WO | WO 03/068874 | 8/2003 |

* cited by examiner

ELECTRONIC TAG

CROSS REFERENCE TO RELATED APPLICATIONS

This application is the U.S. National Stage of International Application Number PCT/GB06/050236 filed on Aug. 10, 2006 which was published in English on Feb. 15, 2007 under International Publication Number WO 2007/017702.

FIELD OF THE INVENTION

The present invention relates to an electronic tag.

BACKGROUND ART

Manufacturers and suppliers of branded or high-value products (which may also be referred to as "goods") often wish to use measures that allow them and/or consumers to determine whether a particular product is genuine or counterfeit. One well-known example of such a measure is a hologram.

Furthermore, manufactures may wish to employ measures which allows them, but not the consumer, to identify an item, for example for tracking stock or covertly identifying counterfeits.

The present invention seeks to provide an electronic tag.

SUMMARY OF THE INVENTION

According to a first aspect of the present invention there is provided an electronic tag comprising a first set of spaced, electrically-conductive lines overlying a substrate, an electrically-insulating layer overlying at least a portion of the first set of lines, a second set of spaced, electrically-conductive lines overlying the insulating layer, arranged to cross the first set of lines, the insulating layer configured to provide at least one region for providing electrical contact between a line in the first set of the conductive lines and a line in the second set of lines, the electrically-conductive lines comprise printed electrically conductive ink and the substrate comprises a consumer product, packaging for a product or printer matter. Thus, the tag can be conveniently applied when printing other indicia on the consumer product, packaging or printed material.

The first set of spaced conductive lines may comprise electrically conductive ink, foil or paint. The first set of spaced conductive lines may each have a respective thickness less than 100 µm. The first set of spaced conductive lines may each have a respective thickness less than 40 µm. The first set of spaced conductive lines may be wavy.

The second set of spaced conductive lines may comprise electrically conductive ink, foil or paint. The second set of spaced conductive lines each may have a respective thickness less than 100 µm. The second set of spaced conductive lines may each have a respective thickness less than 40 µm. The second set of spaced conductive lines may be wavy.

The insulating layer may comprise electrically non-conductive ink. The insulating layer may comprise printed electrically non-conductive ink. The substrate may comprise card or plastics material.

The tag may be disposed on packaging or a card.

The tag may further comprise a masking layer overlying the second set of lines for hiding the tag. The making layer may be the same colour as the substrate or portion of the substrate.

According to a second aspect of the present invention there is provided a consumer product, packaging for a product or printed material having an electronic tag.

According to a third aspect of the present invention there is provided a method of printing comprising providing a substrate comprising a consumer product, packaging for a product or printed material, printing a first set of spaced, electrically-conductive lines comprising ink on the substrate, printing an electrically-insulating layer over an area of the first set of lines, printing a second set of spaced, electrically-conductive lines comprising ink the insulating layer, arranged to cross the first set of lines, the insulating layer configured to provide at least a portion for providing electrical contact between a line in the first set of the conductive lines and a line in the second set of lines and printing indicia on the substrate and/or over the second set of lines.

The method may further comprise providing an intermediate layer between the substrate and the first set of spaced lines.

Printing may be performed using the same printer or plant.

The first and second set of lines may be printed using offset lithography, flexography, screen printing and/or gravure printing.

According to a fourth aspect of the present invention there is provided a method of reading an electronic tag comprising a first set of spaced, electrically-conductive lines overlying a substrate, an electrically-insulating layer overlying an area of the first set of lines, a second set of spaced, electrically-conductive lines overlying the insulating layer, arranged to cross the first set of lines, the insulating layer configured to provide at least a portion for providing electrical contact between a line in the first set of the conductive lines and a line in the second set of lines, the electrically-conductive lines comprise printed electrically conductive ink and the substrate comprises a product, packaging for a product or printed material, the method comprising capacitively probing lines in the tag. This can make probing of the tag easier and allow probing of a concealed tag.

The method may comprise placing a first probe separated from a first pad connected to the line in the first set of conductive lines and applying an alternating signal to the probe and placing a second probe from a second pad connected to the line in the second set of conductive lines and measuring a signal.

BRIEF DESCRIPTION OF THE DRAWINGS

An embodiment of the present invention will now be described by way of example with reference to the accompanying drawings in which.

DETAILED DESCRIPTION OF EMBODIMENT

Figure 1:
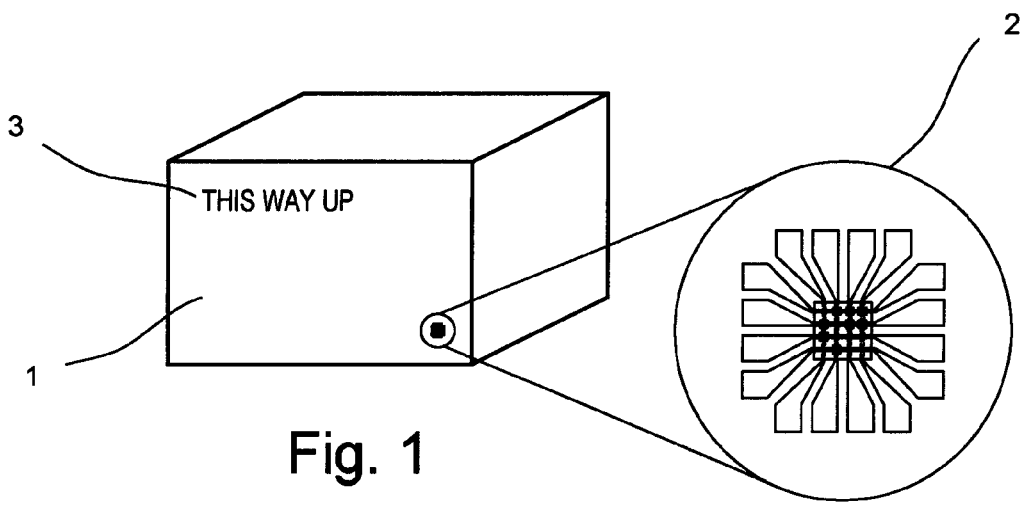
FIG. 1 illustrates a package carrying an electronic tag in accordance with the present invention.

Referring to FIG. 1, packaging 1 in the form of a cardboard box has a printed electronic tag 2 in accordance with the present invention and printed indicia 3. The packaging 1 may be a product or part of the product.

Figure 2:
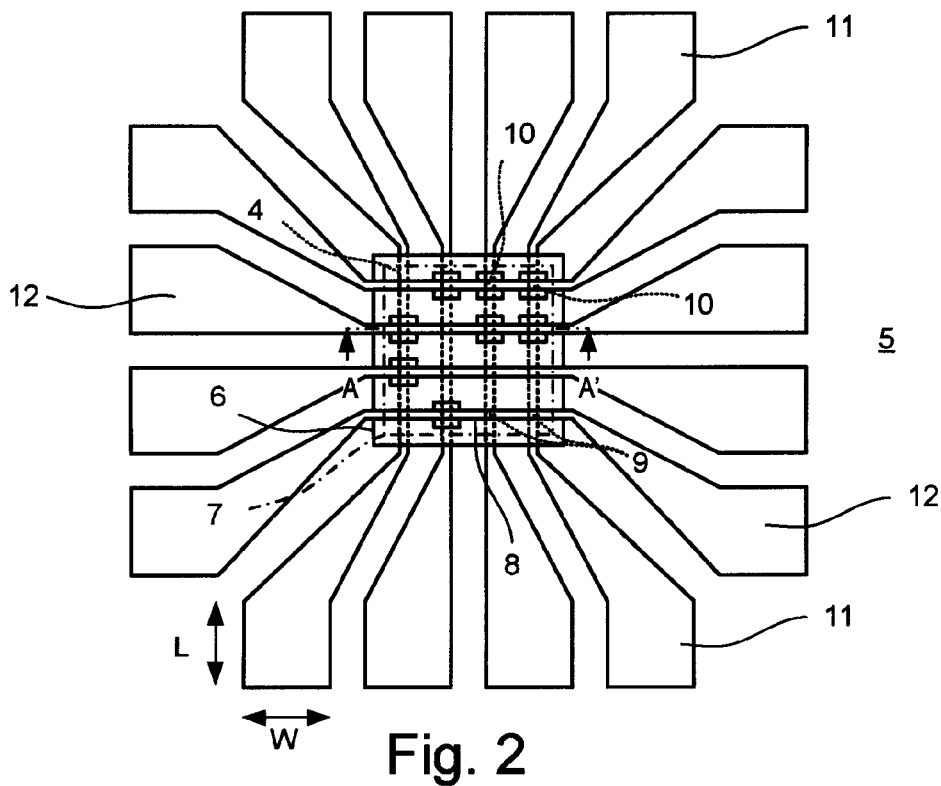
FIG. 2 is a plan view of the electronic tag shown in FIG. 1.
Figure 3:
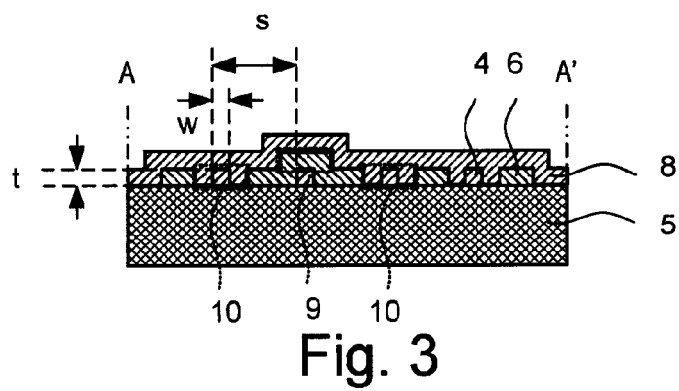
FIG. 3 is a cross section of the electronic tag taken along line A-A' in FIG. 2.

Referring to FIGS. 2 and 3, the printed electronic tag 2 includes a first set of spaced, electrically conductive lines 4 (which may be referred to as "tracks") provided by conductive ink overlying an electrically insulating substrate 5 which is provided by a portion of cardboard box 1. The substrate 5 may comprise card or plastic. An electrically insulating layer 6 comprising non-conductive ink overlies at least a portion 7 of the first set of lines 4. A second set of spaced, electrically conductive lines 8 comprising conductive ink overlies the insulating layer 6. The second set of lines 8 crosses the first set of lines 4. Each line in the second set of lines 8 crosses over each line in the first set of lines 4.

The insulating layer 6 may have at least one region 9 for providing electrical insulation between at least one line in the first set of lines 4 and at least one line in the second set of lines 8 and may have at least one region 10 for providing electrical contact between at least one line in the first set of lines 4 and at least one line in the second set of lines 8. In this example, the regions 9, 10 are configured as a sheet 9 having windows 10 (sometimes referred to as "vias") therein. However, as will be explained in more detail later, other configurations may be used.

The first set of lines 4 has four lines and the second set of lines 8 also has four lines. However, the first set of lines 4 may have n lines, where n is an integer equal or greater than one, in other words $n \geq 1$. Likewise, the second set of lines 8 may have m lines, where m is an integer equal or greater than one, in other words $m \geq 1$. The first and second sets of lines 4, 8 can have different numbers of lines, in other words $n \neq m$.

The lines 4, 8 have a thickness, i.e. depth, (d) at least of the order of 10 μm, in other words $d \approx 10$ μm. However, the lines 4, 8 may be thicker or thinner. The lines 4, 8 may have different thicknesses (d).

The lines 4, 8 each have a width (w) of about 100 μm, in other words $w \approx 100$ μm. However, the lines 4, 8 may be wider or narrower. If the lines have a thickness less than about 100 μm, in other words $w \leq 100$ μm, then they will not be visible to the naked eye. This can help hide the tag 2 from consumers. The lines 4, 8 may have different widths (w) and need not be parallel within the set. The lines 4, 8 are pitched by a distance (s) of about 500 μm, in other words $s \approx 500$ μm. The second sets of lines 8 need not cross the first set of lines 4 at 90° but can be arranged transversely at other angles. The lines 4, 8 need not be straight. For example, one set of lines 4, 8 may be configured as broken concentric circles and the other set of lines may be arranged as radial lines.

Other configurations may be used to help hide the tag 2. A transparent or translucent conductive ink may be used. A masking layer (not shown) may be used to cover or hide the tag 2. For example, the masking layer (not shown) may comprise ink having the same colour as the substrate 5. The lines 4, 8 may be irregularly shaped, for example wavy, or irregularly disposed.

Each line 4, 8 has at least one respective contact region 11, 12 for conveniently receiving a probe member (not shown). In this example, the contact regions 11, 12 are in the form of contact pads 11, 12 disposed at either end of each line 4, 8. However, each line 4, 8 may have only a single respective contact region 11, 12.

The contact pads 11, 12 have width (W) and length (L) which are wider and longer than the width of the lines 4, 8, in other words $W \geq w$ and $L \geq w$. W and L may be of the order of 1 mm.

The contact regions 11, 12 may be extensions of the lines 4, 8 and may have a width (W) which is substantially the same as the width of the lines 4, 8, i.e. $W \approx w$.

The contact regions 11, 12 comprise conductive ink. The first set of lines 4 and their respective contact regions 11 are formed, in this case printed, at the same fabrication step. Likewise, the second set of lines 8 and their respective contact regions 12 are formed at the same fabrication step. However, the contact regions 11, 12 may be formed in a different fabrication step. For example, the contact regions may be formed of conductive foil and may be formed before the lines 4, 8 are formed.

The contact regions 11, 12 may be disposed in a centre region of the tag. The contact regions may be arranged along an edge of the tag, card or product. This can have the advantage that tag, card or product can be slotted into or swiped through a reader (not shown).

The tag 2 can store a number depending on which pairs of lines 4, 8 are connected. The tag 2 can store a 16-bit ($n \times m$-bit) number. However, the maximum value that the electronic tag 2 can store depends upon a coding used.

In this example, absence of a short can represent logical '0' and a short can represent logical '1'. Thus, by probing each pair of lines 4, 8, one at a time, and measuring current, a reader (not shown) can determine whether each pair of lines 4, 8 are electrically connected. Once all the measurements have been completed, the reader (not shown) can identify the number stored in the electronic tag 2.

If the resistances of the lines 4, 8 are too low and if two or more lines in one set of lines 4, 8 are electrically connected to one or more lines in the other set of lines 4, 8, then different numbers may provide the same output. To help overcome this problem, the conductivity per unit length, the length, width and/or spacing of the lines 4, 8 can be selected such that different paths have different resistances which can be used help identify which pairs of lines 4, 8 are connected. The width a line 4, 8 can vary along its length. Suitable values of conductivity per unit length, length, width and spacing of the lines 4, 8 which result in detectable differences in current by a reader having a given sensitivity can be found by routine experiment. A value of resistance for a line 4, 8 may be of the order of 100 or 1000Ω.

To carry out a measurement, probe members, such as needles (not shown), are placed in contact with respective pads 11, 12 of the tag 2, a bias is applied, in turn, across pairs of probe members and the corresponding current is measured.

The measurement need not involve probe members being placed in contact with pads. For example, capacitive probing may be used which employs an ac signal, for example having a frequency of the order of 10 kHz.

The electronic tag 2 is preferably chipless, in other words the tag 2 does not include or is not supported on a chip of semiconductor material, such as silicon or gallium arsenide.

Figure 4A:
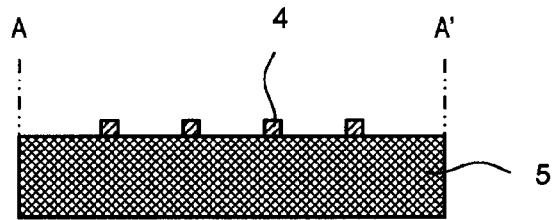
FIGS. 4a to 4c are cross sections of the electronic tag during manufacture.
Figure 4B:
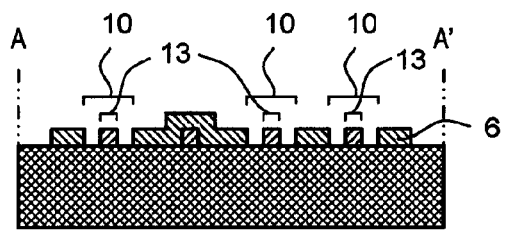
Figure 4C:
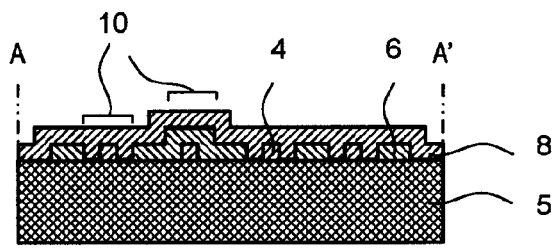

Referring to FIGS. 4a to 4c, a method of fabricating the electronic tag 2 will now be described.

The first set of lines 4 and contact regions 11 are printed on the substrate 5, which in this example is the packaging 1, and the corresponding structure is shown in FIG. 4a.

The insulating layer 6 is printed over the first set of lines 4 and substrate 5 having windows 10 which leave regions 13 of the first set of lines 4 unmasked, and the corresponding structure is shown in FIG. 4b.

The second set of lines 8 and contact regions 12 are printed over the insulating layer 6, unmasked regions 13 of the first set of lines 4 and the substrate 5, and the corresponding structure is shown in FIG. 4c.

Reference is made to WO-A-03068874 which describes a composition of and a method of printing an electrically conductive ink. Conventional ink may be used as a non-conductive ink. The inks and their solvents are chosen so that they do not dissolve the underlying layer. Additionally or alternatively, after an ink has been applied it is cured, for example using ultraviolet (UV) light.

The lines 4, 8, contact pads 11, 12 and insulting layer 6 may be printed a conventional printing process, such as offset lithography, flexography, screen printing or gravure printing.

The lines 4, 8, contact pads 11, 12 and insulting layer 6 may be formed by a process of oil masked vacuum evaporation. In this process, a layer of oil (not shown) is applied to the substrate and selectively masks the substrate. A layer of metal, for example 40 nm thick, is evaporated over the selectively masked substrate. The oil evaporates and a patterned layer of metal is left.

Figure 5:
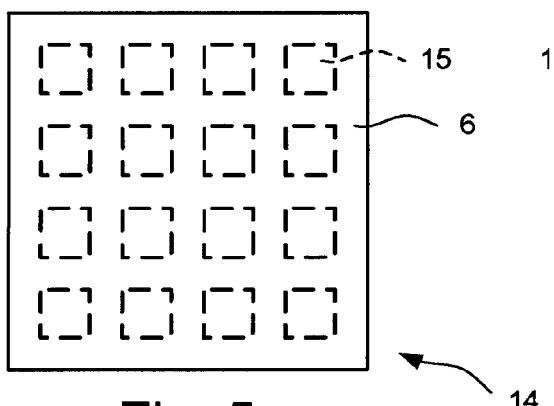
FIG. 5 is a plan view of a first template for an insulating layer.
Figure 6:
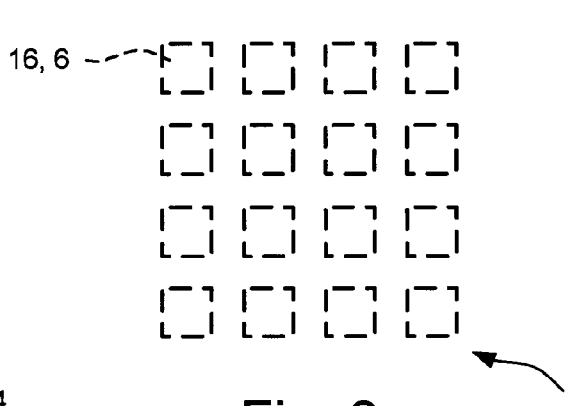
FIG. 6 is a plan view of a second template for an insulating layer.

FIGS. 5 and 6 illustrate templates 14, 14' for the insulting layer 6.

As described earlier, regions 9 of the insulating layer for providing electrical insulation and regions 10 for providing electrical contact are provided by selectively opening one or more windows in areas 15 of the insulating layer 6, as shown in FIG. 5. Alternatively, the regions 9, 10 may be provided by selectively providing pads of the insulating material in areas 16, as shown in FIG. 6. A combination of the configurations may be used.

It will be appreciated that many modifications may be made to the embodiment hereinbefore described. The lines and conductive regions may be formed of conductive paint or foil. The windows in the insulating layer or pads of insulating material need not be rectangular, but may be polygonal, circular, elliptical, ovoid, cruciform or otherwise shaped. The lines may be hidden, for example by printing in a recess provided by another printed layer. The electronic tag need not be used as a security device. The tag may be applied to a trading card or game card. The tag can be applied to an item for providing instructions, such as settings, to a device for receiving the item. For example, the electronic tag may be applied to a sachet containing ground coffee, which is inserted into a coffee maker. Thus, the tag can provide instructions to the coffee maker as to how to prepare the coffee. The electronic tag may be used in applications where a bar code might be used. The electronic tag may be used as an electronic label. The dielectric layer may be deposited and then patterned, for example by cutting or ablating the layer using a laser or needle, or by stamping, deforming or dissolving. The tag may be applied to printed material such as a passport, instruction manual (e.g. for computer software) or valuable printed document (e.g. share certificate or printed money).

What is claimed is:

1. An electronic tag comprising:
   an electrically-insulating substrate comprising a consumer product, packaging for a product or printed material,
   a first set of independent and spaced electrically-conductive lines comprising electrically-conductive ink printed on a face of the electrically-insulating substrate,
   an electrically-insulating layer printed on at least a portion of the first set of lines and the face of the substrate, and
   a second set of independent and spaced electrically-conductive lines comprising electrically-conductive ink printed on the insulating layer, the first set of lines and the face of the substrate and arranged to cross the first set of lines transversely,
   wherein the electrically-insulating layer is configured to provide at least one region of electrical insulation between at least one line in the first set of conductive lines and at least one line in the second set of lines and to provide at least one region of electrical contact between at least one line in the first set of the conductive lines and at least one line in the second set of lines.

2. The electronic tag according to claim 1, wherein the first set of spaced conductive lines each have a thickness less than 100 μm.

3. The electronic tag according to claim 1, wherein the first set of spaced conductive lines each have a respective thickness less than 40 μm.

4. The electronic tag according to claim 1, wherein the first set of spaced conductive lines are wavy.

5. The electronic tag according to claim 1, wherein the second set of spaced conductive lines each have a respective thickness less than 100 μm.

6. The electronic tag according to claim 1, wherein the second set of spaced conductive lines each have a respective thickness less than 40 μm.

7. The electronic tag according to claim 1, wherein the second set of spaced conductive lines are wavy.

8. The electronic tag according to claim 1, wherein the substrate comprises card or paper.

9. The electronic tag according to claim 1, wherein the substrate comprises plastics material.

10. The electronic tag according to claim 1, wherein the printed material is a card.

11. The electronic tag according to claim 1, further comprising a masking layer overlying the second set of lines for hiding the tag.

12. The electronic tag according to claim 11, wherein the masking layer is the same colour as the substrate.

13. The electronic tag according to claim 1, wherein the electrically-insulating layer comprises a sheet having windows.

14. The electronic tag according to claim 1, wherein the electrically-insulating layer comprises spaced apart pads of insulating material.

15. The consumer product or packaging for a product comprising an electronic tag according to claim 1.

16. A method of printing comprising:
    providing an electrically-insulating substrate comprising a consumer product, packaging for a product or printed material;
    printing a first set of independent and spaced electrically-conductive lines comprising electrically-conductive ink on a face of the electrically-conductive substrate;
    printing an electrically-insulating layer on at least a portion of the first set of lines and the face of the substrate; and
    printing a second set of independent and spaced electrically-conductive lines comprising electrically-conductive ink on the insulating layer, the first set of lines and the face of the substrate and arranged to cross the first set of lines transversely,
    wherein the electrically-insulating layer is configured to provide at least one region of electrical insulation between at least one line in the first set of conductive lines and at least one line in the second set of lines and to provide at least one region of electrical contact between at least one line in the first set of the conductive lines and at least one line in the second set of lines.

17. The method according to claim 16, further comprising providing an intermediate layer between the substrate and the first set of lines.

18. The method according to claim 16, wherein printing is performed using the same printer or plant.

19. The method according to claim 16, wherein the first and second sets of lines are printed using offset lithography.

20. The method according to claim 16, wherein the first and second sets of lines are printed using flexography.

21. The method according to claim 16, wherein the first and second sets of lines are printed using screen printing.

22. The method according to claim 16, wherein the first and second sets of lines are printed using gravure printing.

23. A method of reading an electronic tag comprising an electrically-insulating substrate comprising a consumer product, packaging for a product or printed material, a first set of independent and spaced electrically-conductive lines comprising electrically-conductive ink printed on a face of the electrically-insulating substrate, an electrically-insulating layer printed on at least a portion of the first set of lines and the face of the substrate, and a second set of independent and spaced electrically-conductive lines comprising electrically-conductive ink printed on the insulating layer, the first set of lines and the face of the substrate and arranged to cross the first set of lines transversely, wherein the electrically-insulating layer is configured to provide at least one region of electrical insulation between at least one line in the first set of conductive lines and at least one line in the second set of lines and to provide at least one region of electrical contact between at least one line in the first set of the conductive lines and at least one line in the second set of lines, the method comprising:

capacitively probing lines in the tag.

24. The method according to claim 23, comprising:

placing a first probe separated from a first pad connected to a line in the first set of conductive lines and applying an alternating signal to the probe and placing a second probe from a second pad connected to a line in the second set of conductive lines and measuring a signal.

* * * * *